US006259491B1

(12) United States Patent
Ekedahl et al.

(10) Patent No.: US 6,259,491 B1
(45) Date of Patent: *Jul. 10, 2001

(54) DOUBLE SIDED LAMINATED LIQUID CRYSTAL DISPLAY TOUCHSCREEN AND METHOD OF MAKING SAME FOR USE IN A WIRELESS COMMUNICATION DEVICE

(75) Inventors: Christine Ann Ekedahl, Palatine; Robert Stinauer, Arlington Heights, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,888

(22) Filed: Feb. 6, 1998

(51) Int. Cl.[7] ............................... G02F 1/133; G02F 1/137
(52) U.S. Cl. ............................... 349/23; 345/173; 178/18
(58) Field of Search ............................... 349/23; 345/173; 178/18

(56) References Cited

U.S. PATENT DOCUMENTS

| 4,870,458 | 9/1989 | Shibuya ............................... 355/200 |
| 5,422,656 | * 6/1995 | Allard et al. ............................... 345/173 |
| 5,528,266 | * 6/1996 | Arbeitman et al. ............................... 345/173 |
| 5,548,306 | * 8/1996 | Yates, IV et al. ............................... 345/174 |
| 5,576,036 | * 11/1996 | Yates, IV ............................... 345/173 |
| 5,623,280 | * 4/1997 | Akins et al. ............................... 345/104 |
| 5,631,805 | * 5/1997 | Bonsall ............................... 361/681 |
| 5,633,660 | * 5/1997 | Hansen et al. ............................... 345/173 |
| 5,636,101 | * 6/1997 | Bonsall et al. ............................... 361/681 |

FOREIGN PATENT DOCUMENTS

| 789295A1 | 8/1997 | (EP) . |
| 817110A2 | 1/1998 | (EP) . |
| 2301217A | 11/1996 | (GB) . |
| WO94/18664 | 8/1994 | (WO) . |

* cited by examiner

*Primary Examiner*—William L. Sikes
*Assistant Examiner*—Robert J. Hollingshead
(74) *Attorney, Agent, or Firm*—Lalita P. Williams

(57) ABSTRACT

A touchscreen (126) for assembly onto a liquid crystal display module (119) in a wireless communication device (103). The touchscreen is comprised of a front laminant pet film (127), a chemically strengthened glass panel (129), an optically clear acrylic adhesive (131) and a rear laminant pet film (133). The rear laminant pet film (133) greatly increases the strength and durability of the touchscreen (126) and eliminates the need for a protective lens over the display module of the wireless communication device (103).

10 Claims, 2 Drawing Sheets

DOUBLE SIDED LAMINATED LIQUID CRYSTAL DISPLAY TOUCHSCREEN AND METHOD OF MAKING SAME FOR USE IN A WIRELESS COMMUNICATION DEVICE

FIELD OF THE INVENTION

The present invention relates generally to the field of wireless communication, and more particularly to a personal radio transceiver. Although, the invention is subject to a wide range of applications, it is especially suited for use in a handheld radiotelephone, and will be particularly described in that connection.

BACKGROUND OF THE INVENTION

Liquid crystal displays incorporating touchscreens for use in a radiotelephone are known in the art. These touchscreens typically include four layers, a front laminant (pet film) layer, a circuitry layer having a flex tail for connection to a microprocessor in the radiotelephone, an adhesive layer and a glass panel that shows the active and viewing area of the touchscreen. Among other things, the front laminant serves as a protective covering for the glass layer. However, when the radiotelephone is not in use, additional protective covering for the touchscreen is needed because the front laminant is not strong enough to protect the glass layer from breaking or cracking in the event that the telephone is dropped or otherwise abused. This additional protective covering increases the size and expense of the phone.

Accordingly, there is a need for a touchscreen that can be used with a liquid crystal display module without a protective cover to prevent the assembly from breaking or cracking when the radiotelephone is dropped or otherwise abused.

SUMMARY OF THE PREFERRED EMBODIMENT

The present invention provides a durable touchscreen and method for making the same that can be used with a display module in a wireless communication device such as a radiotelephone. In the presently preferred embodiment, the touchscreen includes a front laminant; a circuitry layer having a flex tail; a first adhesive layer applied to the underside of the circuitry layer; a glass panel having a top surface and a bottom surface, the top surface applied to the first adhesive layer; a second adhesive layer applied to the bottom surface of the glass panel; and a rear laminant applied to the second adhesive layer such that the glass panel and the rear laminant are coupled together. The rear laminant greatly increases the strength of the touchscreen, thereby eliminating the need for a protective lens to prevent the touchscreen from breaking or cracking when it is dropped. The elimination of the protective lens reduces the volume and weight of the radiotelephone and optimizes the look and feel of the product.

Additional advantages and novel features of the invention will be set forth in part in the description which follows, wherein the preferred embodiment of the invention is shown and described. Reference will now be made in detail to an embodiment configured according to the present invention.

DESCRIPTION OF THE PREFERRED EMBODIMENT

The preferred embodiment of the present invention preferably includes a radio communication device 103 having a touch screen 126 disposed in the body housing element 107 for displaying functional icons associated with particular communication services such as telephone, e-mail, fax, short messaging service or other service. The functional icons displayed on the screen can be accessed by touching the screen with a stylus or writing implement.

Figure 1:
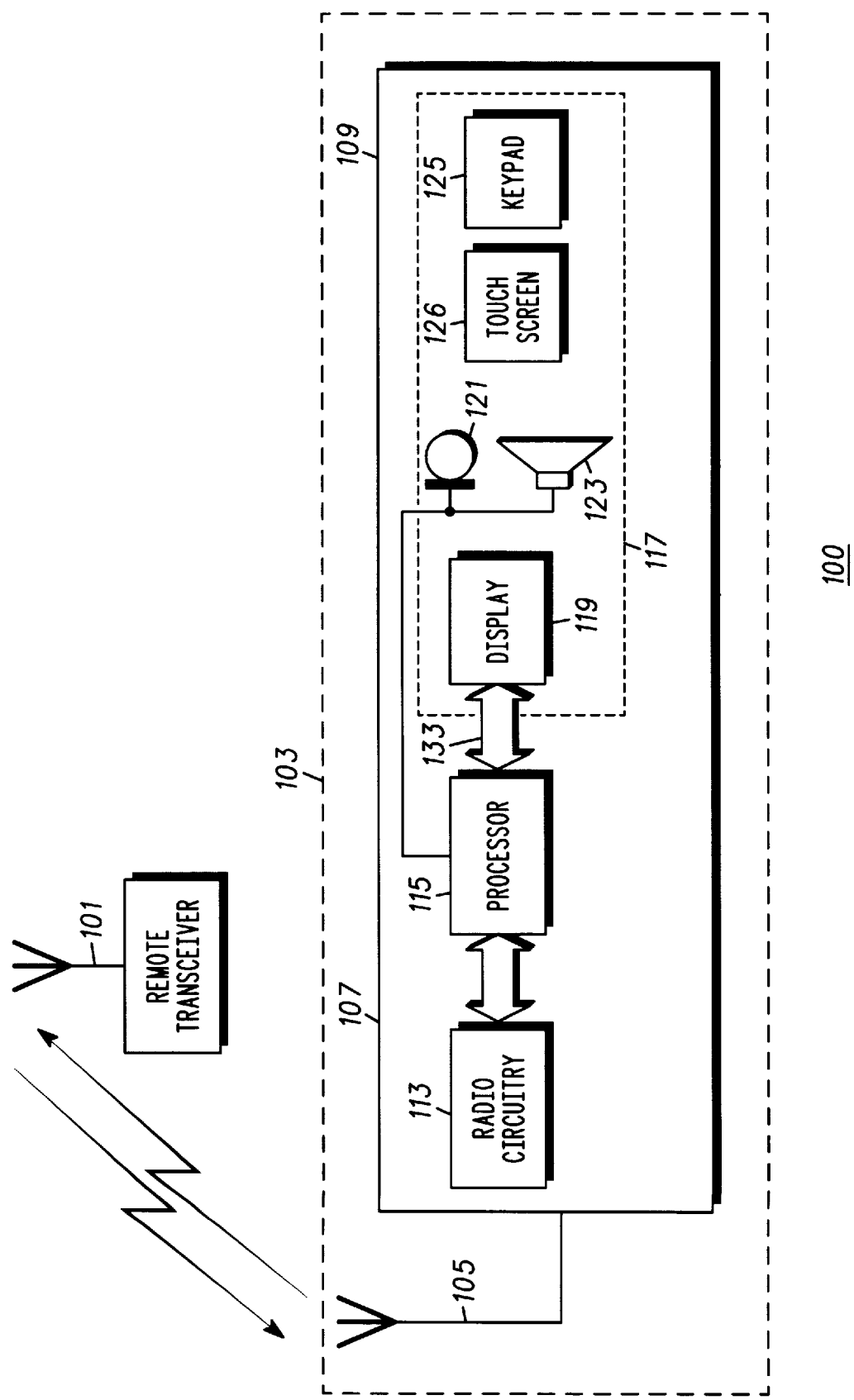
FIG. 1 is a block diagram of a radio communication system in which the preferred embodiment of the touchscreen of the present invention can be implemented.

FIG. 1 is a block diagram of a radio communication system 100. The radio communication system 100 includes a remote transceiver 101 for sending and receiving radio frequency (RF) signals to and from multiple radio communication devices within a fixed geographic area. The radio communication device 103 is one such radio communication device contained within the geographic area served by the remote transceiver 101. The RF signals transmitted between the remote transceiver 101 and the radio communication device 103 provide radio communication services such as radiotelephone service, electronic mail service, wireless fax service and short message service. Other embodiments of the present invention may include other combinations of these communication services and other radio communication services.

The radio communication device 103 includes an antenna 105 and a body housing element 107. In the preferred embodiment, the body housing element 107 includes radio circuitry 113, a processor 115, and a portion of a user interface 117. The user interface 117 includes a display module 119, a touchscreen 126, a microphone 121, a speaker 123, and a keypad 125.

The radio communication device 103 receives the RF signals through the antenna 105 and converts the received RF signals into electrical RF signals for use by the radio circuitry 113. The radio circuitry 113 demodulates the electrical RF signals and recovers the data transmitted using the RF signals. Additionally, the radio circuitry 113 outputs the data to the processor 115. The processor 115 includes at least a main microprocessor such as an MC68040 available from Motorola, Inc., and associated memory as well as other control circuits including integrated circuits or other known technologies. The processor 115 formats the data output from the radio circuitry 113 into a recognizable voice or messaging information for use by the user interface 117. The user interface 117 communicates the received information or voice to a user through the use of the speaker 123 and the touchscreen 126 used with the display module 119.

Upon transmission of RF signals from the radio communication device 103 to the remote transceiver 101, the user interface 117 transmits user input data to the processor 115. Such data may include voice data and/or messaging information. The processor 115 formats the information obtained from the user interface 117 and transmits the formatted information to the radio circuitry 113. The radio circuitry 113 converts the formatted information into electrical RF modulated signals to the antenna 105 for transmission back to the remote transceiver 101

Figure 2:
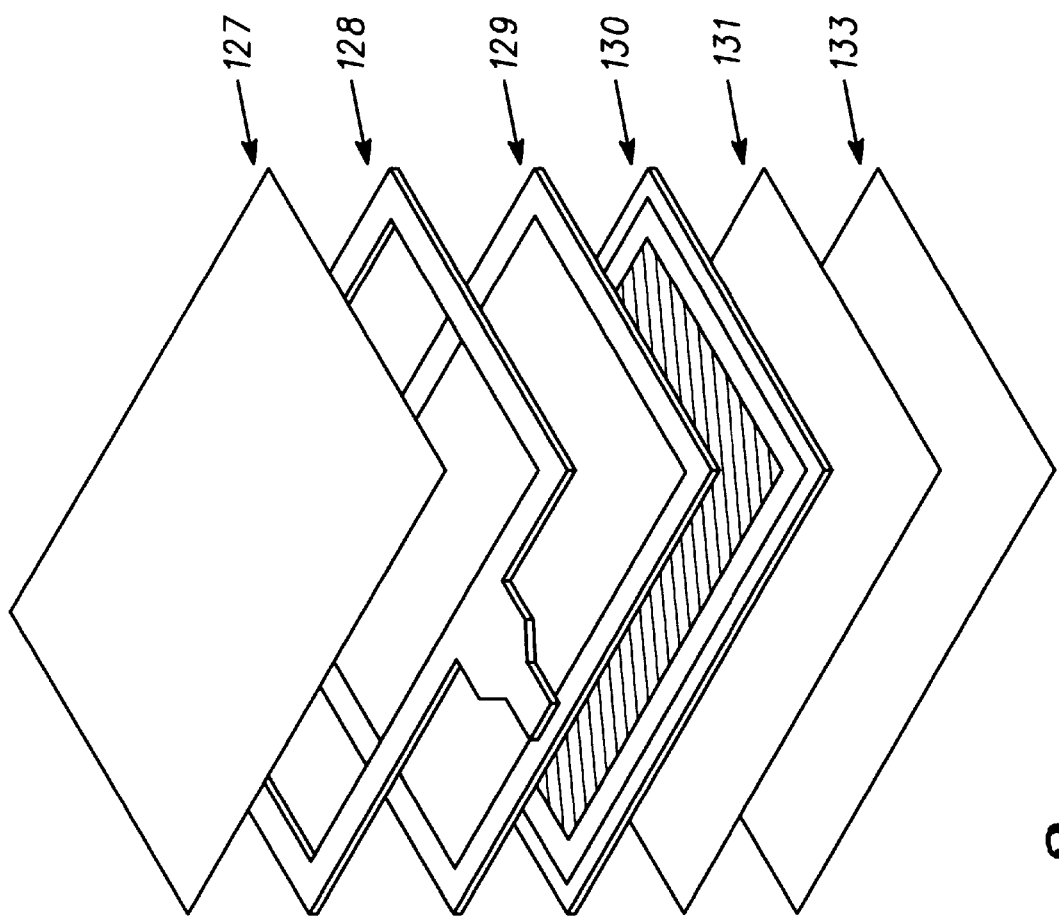
FIG. 2 is a detailed illustration of the preferred embodiment of the touchscreen of the present invention that can be used with the display module shown in FIG. 1.

FIG. 2 is a detailed illustration of the touchscreen 126 shown in FIG. 1. In the presently preferred embodiment, touchscreen 126 includes six layers: a front laminant pet film 127 commercially available from GE Plastics, Pittsfield, Mass.; a circuitry layer 128, preferably having a flex tail for connection to microprocessor 115 shown in FIG. 1; a first layer of adhesive 129, preferably an optically clear acrylic adhesive commercially available from 3M Corporation, Rochester, Minn.; a glass panel 130, preferably a chemically strengthened glass commercially available from PPG glass, Elgin, Ill.; a second layer of adhesive 131, preferably the optically clear acrylic adhesive commercially available from 3M Corporation; and a rear laminant pet film 133 commercially available from GE Plastics.

In the preferred embodiment, the front laminant 127 is disposed on a top surface of the circuitry layer 128. A top surface of the glass panel 130 is coupled to the underside of circuitry layer 128 using the first layer of adhesive 129. Then, the rear laminant 133 is coupled to the bottom surface of the glass panel 130 using the second layer of adhesive 131. Finally, the touchscreen is assembled on the front side of the LCD display module with adhesive.

Radiotelephones incorporating the preferred embodiment of the touchscreen 126 of the present invention were subjected to six (6) foot drop tests and ball bearing impact tests ("drop tests") to ensure that the display module 119 and the touchscreen 126 can withstand being dropped or otherwise abused by a user without breaking or cracking. In addition, these tests were performed on the commonly used touchscreens that include only the first four layers (front laminant pet film 127, circuitry layer 128, adhesive 129 and glass panel 130) to show the impact of the back laminant 133 on the touchscreen 126. The touchscreens 126 of the present invention survived the drop tests from a height fifty (50) percent higher than the height at which the conventional touchscreens consisting of only four layers survived.

The test results show that the touchscreen 126 of the present invention, which incorporates both a front laminant 127 and a rear laminant 133 surrounding the glass panel 129, meets high requirements of durability and eliminates the need for an acrylic lens to protect the display 119. Eliminating the protective lens allows the radio communication device 103 to utilize the touchscreen feature while reducing the device's 103 overall weight and volume, thereby optimizing the overall product for the customer.

Those skilled in the art will recognize that various modifications and variations can be made in the apparatus of the present invention and in construction of this apparatus without departing from the scope or spirit of this invention.

What is claimed is:

1. A touchscreen for a liquid crystal display module comprising:
    a front laminant;
    a circuitry layer disposed underneath the front laminant;
    a glass panel disposed underneath the circuitry layer; and
    a rear laminant coupled to the glass panel using an adhesive.

2. The touchscreen of claim 1 wherein the front laminant is a pet film.

3. The touchscreen of claim 1 wherein the glass panel is a chemically strengthened glass panel.

4. The touchscreen of claim 1 wherein the adhesive is an optically clear acrylic adhesive.

5. The touchscreen of claim 1 wherein the rear laminant is a pet film.

6. The touchscreen of claim 1 wherein the circuitry layer includes a flex tail for connecting the layer to a microprocessor.

7. A touchscreen for a liquid crystal display module comprising:
    a front laminant;
    a circuitry layer disposed underneath the front laminant;
    a glass panel having a top surface and a bottom surface, the top surface coupled to the circuitry layer with a first layer of adhesive;
    a rear laminant coupled to the bottom surface of the glass panel with a second layer of adhesive.

8. A radio communication device including an antenna; radio circuitry; a processor; a display including a touchscreen; a microphone; a speaker and a keypad wherein the touchscreen comprises a front laminant; a glass panel disposed under a surface of the front laminant; an adhesive applied to a surface of the glass panel; and a rear laminant applied to the adhesive such that the glass panel and the rear laminant are coupled together.

9. A method of making a touchscreen having a front laminant, a circuitry layer, a glass panel having a top surface and a bottom surface, an adhesive and a rear laminant, the method comprising the steps of:
    disposing the front laminant on the circuitry layer;
    disposing the circuitry layer on the top surface of the glass panel; and
    coupling the rear laminant to the bottom surface of the glass panel with the adhesive.

10. A radio communication device including an antenna; radio circuitry; a processor; a display including a touchscreen; and a speaker wherein the touchscreen comprises a front laminant; a glass panel disposed under a surface of the front laminant; an adhesive applied to a surface of the glass panel; and a rear laminant applied to the adhesive such that the glass panel and the rear laminant are coupled together.

* * * * *